No. 656,751. Patented Aug. 28, 1900.
A. SCHWARZ.
SENSITIZED PHOTOGRAPHIC PAPER.
(Application filed Aug. 9, 1899.)
(No Model.)
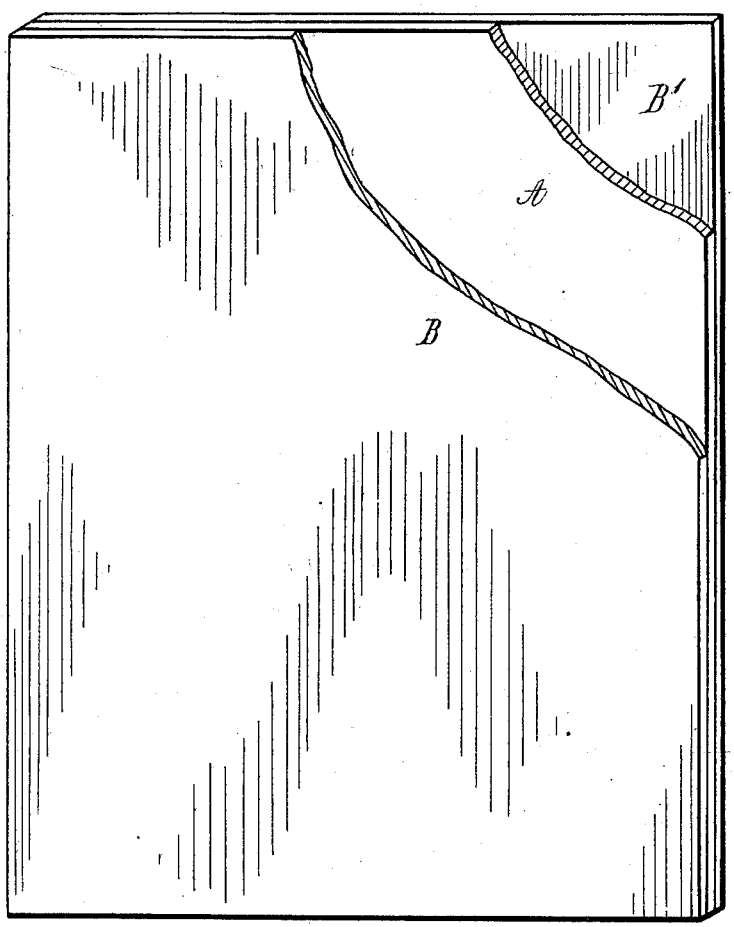
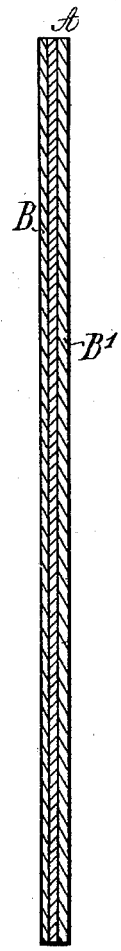
Inventor
Arthur Schwarz

UNITED STATES PATENT OFFICE.

ARTHUR SCHWARZ, OF STEGLITZ, GERMANY.

SENSITIZED PHOTOGRAPHIC PAPER.

SPECIFICATION forming part of Letters Patent No. 656,751, dated August 28, 1900.

Application filed August 9, 1899. Serial No. 726,717. (No specimens.)

*To all whom it may concern:*

Be it known that I, ARTHUR SCHWARZ, a subject of the German Emperor, and a resident of Steglitz, Germany, have invented certain new and useful Improvements in the Preparation of Sensitized Media for Photographic Purposes; and I do hereby declare the following to be a full, clear, and exact description of the invention.

In the preparation of sensitized media for photographic purposes, whether for use in the production of positives, diapositives, or negatives, it has been the constant aim to increase the sensitiveness of these media to the action of light with a view to correspondingly increasing the strength of the image produced and to correspondingly decrease the duration of exposure.

This invention has for its object the provision of means whereby the sensitiveness to light of photographic media is increased to a degree greater than is possible by the processes heretofore resorted to.

Experiments made by me have shown that a thin paper capable of transmitting light and properly sensitized when exposed to the action of light the latter not only completely penetrates through the sensitizing-coating, but also through the paper itself, so that if a second sensitized medium is exposed behind such a paper medium the action of the light on the former will be substantially the same as upon the latter medium. This fact led me to the discovery that a photographic medium of much greater sensitiveness than that possessed by media such as heretofore prepared could be obtained by sensitizing both surfaces of a paper capable of transmitting light, and I have found this to be a fact, especially when what I term a "grainless" paper is used—that is to say, a paper of uniform light-transmitting power throughout its area, or, in other words, a paper free from parts having greater light-transmitting power than others. Such a paper is available for the production of positives and diapositives as well as negatives and has in each of these uses not only the advantage of being much more sensitive to light than the media heretofore specially prepared for these purposes, but also other important advantages. Thus, for instance, in the preparation of the so-called "positive" photographic paper the latter before being sensitized is coated with some substance that will prevent the absorption by the paper of the chemicals—as, for instance, baryta or glue—without which the positive image obtained would be weak and the finer details either lost or not sharply defined. This preliminary coating of the positive paper is obviated by my invention in that the absorption by the light-transmitting paper of the sensitizing solution applied to one face is quickly checked by the coagulation of the carrier (gelatin or albumen) for the sensitized salts and by the application of a like carrier to the opposite face of the paper, or, in other words, a portion of the sensitized solution applied to one face of the paper will be absorbed thereby and may even saturate the paper; but this will the more effectually prevent the absorption of any portion of the sensitized solution applied to the opposite face of such paper which then forms a perfect surface coating, whereby the properties of the paper are greatly enhanced. If a paper such as described is exposed to light, two images are obtained, one on each face of the paper, which on being developed complete and strengthen each other, the lights and shadows and the semitones being brought out to a degree impossible of attainment with the paper now in use. Furthermore, it is obvious that the time of exposure can be materially reduced, which, under certain conditions—as, for instance, in enlarging pictures—is of great importance.

It is often the case in photography to use papers of different degrees of sensitiveness in order to select the one producing the best results with a negative of a given character. This waste of paper and labor is also avoided by my invention by coating the opposite faces of the paper with solutions the sensitiveness to light of which differs. Thus, for instance, one face of the paper may be coated with a soft highly-sensitive emulsion and the opposite face with an emulsion of low sensitiveness. By these means I am enabled not only to dispense with the employment of separate papers, but I am also enabled to vary the time of exposure. The intensity of the two images obtained on a paper prepared as just described differs, especially in the depth of the shadows, the difference being strongly defined; but the two images so complete each other as to form a highly-harmonious, strong, and well-defined image seen both by looking at or by looking through the medium. From what has just been said it is obvious that paper treated on both sides with solutions the sensitiveness to light of which differs is of especial advantage for the production of diapositives, and such paper has the further advantage of being infrangible and of performing also the function of a ground-glass plate.

My invention therefore consists, essentially, in a transparent photographic paper having its opposite faces sensitized with solutions whose sensitiveness to light differs.

In the accompanying drawings, Figure 1 is a plan perspective, partly broken away; and Fig. 2, a longitudinal section of a sheet of photographic paper prepared according to my invention.

In said figures of drawings, A indicates the sheet of transparent paper, preferably one that is naturally transparent—i. e., not rendered so by the application of a fatty substance, as oil or wax and the like—and also preferably, as much as possible, free from grain.

B and B' indicate the sensitive coatings on opposite faces of the sheet A, of which B is more sensitive to light than B', and it is this surface which is exposed to light.

In the production of diapositives special means involving additional expense are resorted to with a view to reducing the transparency of the plates in order to obtain the best possible effects. To this end various means have been resorted to—as, for instance, the use of a so-called "opal," or milk-white or ground-glass plates as carriers for the sensitizing agent or by combining a sensitized transparent plate with a second transparent plate having a translucent coating—the use of these plates being avoided by my invention, while the paper prepared in accordance therewith, being flexible, can be manufactured mechanically, in that it can be drawn in the web through the sensitizing solution or solutions. So-called "negative" paper has heretofore found but a restricted use because of the coarse texture thereof, which becomes apparent in the copy, while the oil, by means of which the paper is made transparent, interferes with the copying and developing, to avoid which so-called "films" are used. All the disadvantages inherent to paper-carriers for the sensitizing agent are obviated by my invention, while the means heretofore employed to render paper transparent are also avoided. My improved photographic paper possesses also great advantages over the so-called "negative plates," "films," and the like in that the white back of the paper refracts the light passing therethrough, which has the effect of a second or double illumination or exposure. This in itself results in a stronger action of the light upon the directly-exposed sensitized surface of the paper, and in the production of negatives this is of great moment in that silver chlorid, for instance, possesses a comparatively low sensitiveness to light, which is based upon its limited power of absorbing light-rays.

Paper prepared in accordance with my invention is not only an excellent light infrangible substitute for the heavy frangible glass plates and films, but it possesses greater sensitiveness to light, produces better results, and is available for the production of positives, diapositives, and negatives.

Having thus described my invention, what I claim as new therein, and desire to secure by Letters Patent, is—

1. As a new article of manufacture, a photographic paper having both faces sensitized, the coating on one face being more sensitive to light than that on the opposite face, for the purpose set forth.

2. As a new article of manufacture, a photographic paper naturally transparent and substantially grainless having its opposite faces sensitized, the coating on one face being more sensitive to light than that on the opposite face, for the purposes set forth.

In testimony that I claim the foregoing as my invention I have signed my name in presence of two subscribing witnesses.

ARTHUR SCHWARZ.

Witnesses:
HENRY HASPER,
WOLDEMAR HAUPT.